(12) United States Patent
Cheng

(10) Patent No.: US 7,171,488 B2
(45) Date of Patent: Jan. 30, 2007

(54) MANAGING DATA DELIVERY IN A DATA COMMUNICATIONS NETWORK

(75) Inventor: Ting D. Cheng, Mahopac, NY (US)

(73) Assignee: International Business Machines Corporation, Armonk, NY (US)

(*) Notice: Subject to any disclaimer, the term of this patent is extended or adjusted under 35 U.S.C. 154(b) by 633 days.

(21) Appl. No.: 10/189,723

(22) Filed: Jul. 3, 2002

(65) Prior Publication Data

US 2004/0018844 A1   Jan. 29, 2004

(51) Int. Cl.
*G06F 15/173* (2006.01)
(52) U.S. Cl. ...................... 709/238
(58) Field of Classification Search ............ 709/203, 709/207, 224, 225, 238–244; 455/404, 405, 455/456; 705/400–411, 417, 418; 701/200–226
See application file for complete search history.

(56) References Cited

U.S. PATENT DOCUMENTS

| | | | | |
|---|---|---|---|---|
| 5,805,816 A * | 9/1998 | Picazo et al. | | 709/223 |
| 5,841,762 A | 11/1998 | Hershey | | 370/252 |
| 5,867,495 A * | 2/1999 | Elliott et al. | | 370/352 |
| 6,005,926 A | 12/1999 | Mashinsky | | 379/114 |
| 6,154,776 A * | 11/2000 | Martin | | 709/226 |
| 6,202,082 B1 | 3/2001 | Tomizawa et al. | | 709/201 |
| 6,237,786 B1 | 5/2001 | Ginter et al. | | 213/153 |
| 6,253,241 B1 * | 6/2001 | Chaddha | | 709/223 |
| 6,256,675 B1 * | 7/2001 | Rabinovich | | 709/241 |
| 6,421,716 B1 * | 7/2002 | Eldridge et al. | | 709/219 |
| 6,463,454 B1 * | 10/2002 | Lumelsky et al. | | 709/223 |
| 6,584,177 B2 * | 6/2003 | Rizzi et al. | | 379/32.01 |
| 6,640,184 B1 * | 10/2003 | Rabe | | 455/456.2 |
| 6,744,403 B2 * | 6/2004 | Milnes et al. | | 342/357.07 |
| 2001/0055369 A1 * | 12/2001 | Rizzi et al. | | 379/35 |
| 2002/0010745 A1 * | 1/2002 | Schneider | | 709/206 |
| 2002/0055924 A1 * | 5/2002 | Liming | | 707/100 |
| 2002/0133473 A1 * | 9/2002 | Grande et al. | | 705/418 |
| 2002/0152319 A1 * | 10/2002 | Amin et al. | | 709/232 |
| 2002/0199018 A1 * | 12/2002 | Diedrich et al. | | 709/245 |
| 2003/0117954 A1 * | 6/2003 | De Neve et al. | | 370/230 |
| 2004/0054732 A1 * | 3/2004 | Carter et al. | | 709/206 |
| 2004/0111477 A1 * | 6/2004 | Boss et al. | | 709/206 |
| 2004/0133626 A1 * | 7/2004 | Herrero et al. | | 709/200 |
| 2004/0192339 A1 * | 9/2004 | Wilson et al. | | 455/456.1 |
| 2004/0236620 A1 * | 11/2004 | Chauhan et al. | | 705/9 |

(Continued)

OTHER PUBLICATIONS

Time synchronization for VoIP quaity of service, Melvin H, Murphy L, Internet Computing, IEEE May Jun. 2002, vol. 6 Issue 3, pp. 57-63.*

(Continued)

*Primary Examiner*—Jason Cardone
*Assistant Examiner*—Ajay Bhatia
(74) *Attorney, Agent, or Firm*—Akerman Senterfitt

(57) ABSTRACT

A method of managing network resources in a terminating node of an information delivery network can include receiving an inbound data container comprising a data item. The data container can specify a size of the data item and global positioning information for an originating node in the information delivery network. Global positioning information can be determined for the terminating node. Accordingly, the inbound data container can be analyzed by comparing the global positioning information for the originating node and the terminating node.

8 Claims, 2 Drawing Sheets

U.S. PATENT DOCUMENTS

2005/0004877 A1* 1/2005 McLellan et al. ........... 705/400
2005/0066044 A1* 3/2005 Chaskar et al. ............. 709/230

OTHER PUBLICATIONS

A Fine-Grained Addressing Concept for GeoCast, Lecture Notes in Computer Science, Springer Berlin/Keidelberg. Jul. 31, 2003.*
Aided Routing (LAR) in mobile ad hoc networks, Springer Netherlands, Nov. 29, 2004.*
GPS-based geographic addressing, routing and resource discovery, Tomasz Imielinski, Julio C. Nevas, Communication of the ACM, col. 42 iss 4, Apr. 1999, pp. 86-92.*
On Maximizing service-level-agreement profits, Zhen Liu, Marks Squillante, Joel L Wolf, Electronic COmmerce, Proceedings of the 3rd ACM conference on Electronic Commerce, pp. 213-223, 2001.*
RFC 2386, E. Cawley et al, A Framework for Qos-based Routing in the Internet, Aug. 1998.*
Qos Issues in ad hoc wireless networks, Chakrabarti S., Mishra, A., Communications Magazine, IEEE, Feb. 2001.*
Depth first search and location based localized routing and QoS routing in wireless networks Stojmenovic, I. Russell, M. Vukojevic, B.SITE, Ottawa Univ., Ont., Canada; This paper appears in: Parallel Processing, 2000. Proceedings. 2000 International Confer.*
U.S. Appl. No. 09/862,732, filed Jan. 23, 2002, Cheng et al.

* cited by examiner

MANAGING DATA DELIVERY IN A DATA COMMUNICATIONS NETWORK

BACKGROUND OF THE INVENTION

1. Technical Field

This invention relates to the field of network management, and more particularly, to geographically monitoring data paths within a network.

2. Description of the Related Art

The pervasiveness of electronic communication media such as the Internet has allowed individuals, companies, and organizations to take advantage of various electronic services and opportunities. Although technological innovations allow ever increasing amounts of data to be exchanged among users, network congestion still remains a problem. In general, user demand has outpaced the deployment of new technologies and resources.

One cause of network congestion has been the development of high bandwidth services such as voice, video, and other applications requiring large data throughput with regard to both inbound data and outbound data. The creation of handheld information appliances providing wireless network access further has aggravated network congestion.

While many users demand greater bandwidth for modern Internet services, other users have not embraced high bandwidth services. Accordingly, a network need not provide significant bandwidth to each user. Rather, the network need only provide increased bandwidth to those users utilizing broadband services or requiring faster access to information. Presently, however, users are provided with online access and pay for that access despite the user's individual amount of bandwidth usage.

Thus, in spite of the overall increase in demand for bandwidth in large networks, often there is a disproportionate utilization of bandwidth by users. For example, Internet users using more sophisticated equipment typically command a disproportionately larger amount of bandwidth as compared to other users. It is therefore necessary to better control and distribute bandwidth usage over these large networks.

SUMMARY OF THE INVENTION

The invention disclosed herein provides a solution for managing network resources in an information delivery network. The present invention provides a simplified and streamlined alternative to the conventional complex and detailed methods of managing network resources presently available. In particular, the present invention utilizes data container technology in combination with global positioning system information to monitor information delivery network usage and various performance metrics of the network relating to bandwidth usage, the locations from which data is requested and sent, as well as the time required to deliver information.

One aspect of the present invention can include a method of managing network resources in a terminating node of an information delivery network. The method can include receiving an inbound data container including a data item. The data container can specify a size of the data item and global positioning information for an originating node in the information delivery network. Global positioning information for the terminating node can be determined. The inbound data container can be analyzed by comparing the global positioning information for the originating node and the terminating node.

The inbound data container can specify, for example, a type of the data item contained therein and a grade of delivery service. Accordingly, the analyzing step can include associating a monetary value with the inbound data container according to at least one of the size of the data item, the type of the data item, and the grade of delivery service. The analyzing step also can include calculating a distance between the originating node and the terminating node, associating a monetary value with the data container according to the determined distance, determining bandwidth usage which may or may not be on a per user basis according to the received inbound data container, calculating a measure of time between the data container being sent from the originating node and the data container being received by the terminating node, and associating a monetary value with the inbound data container according to the measure of time.

Another embodiment of the invention can include determining one of a plurality of originating nodes having duplicate items of information which can provide at least one of the items of duplicate information in a smallest measure of time. At least one of the duplicate items of information can be requested from the one of the plurality of originating nodes. The method further can include determining which one of a plurality of originating nodes having duplicate items of information is closest to the terminating node and requesting at least one of the duplicate items of information from the closest one of the plurality of originating nodes.

The method also can include consulting a delivery profile specifying data container attributes of allowable data containers, comparing the received data container with the delivery profile, and determining whether to accept delivery of the inbound data container. For example, the delivery profile can specify regions from which allowable data containers can originate.

According to another embodiment of the invention, the method can include associating a data request with an outbound data container wherein the outbound data container specifies a size of the data request. A second set of global positioning information for the terminating node can be determined and included within the outbound data container. The outbound data container can be sent through the information delivery network. The bandwidth usage can be determined according to the sent outbound data container. The method also can include allocating a predetermined number of the inbound and outbound data containers to accounts and tracking consumption of the allocated inbound and outbound data containers to determine bandwidth usage. Alternatively, the method can include allocating a predetermined number of data containers to accounts wherein the data containers are to be used as both inbound and outbound data containers. The consumption of the allocated data containers can be tracked to determine bandwidth usage.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a solution for managing network resources in an information delivery network. According to the present invention, data container technology can be used to monitor the amount of bandwidth consumed by users within the network. The data containers can specify a variety of attributes including the size of data contained within the containers. The data containers can be geographically monitored within the information delivery network to better manage the flow of information among users. In particular, various points within the network can be equipped with global positioning system (GPS) receivers to include GPS information as attributes of the data containers as the data containers pass through the GPS-enabled network nodes. Accordingly, the present invention provides for the geographic tracking of information as well as the implementation of delivery rules to selectively accept or reject data items from various locations within the network.

Figure 1:
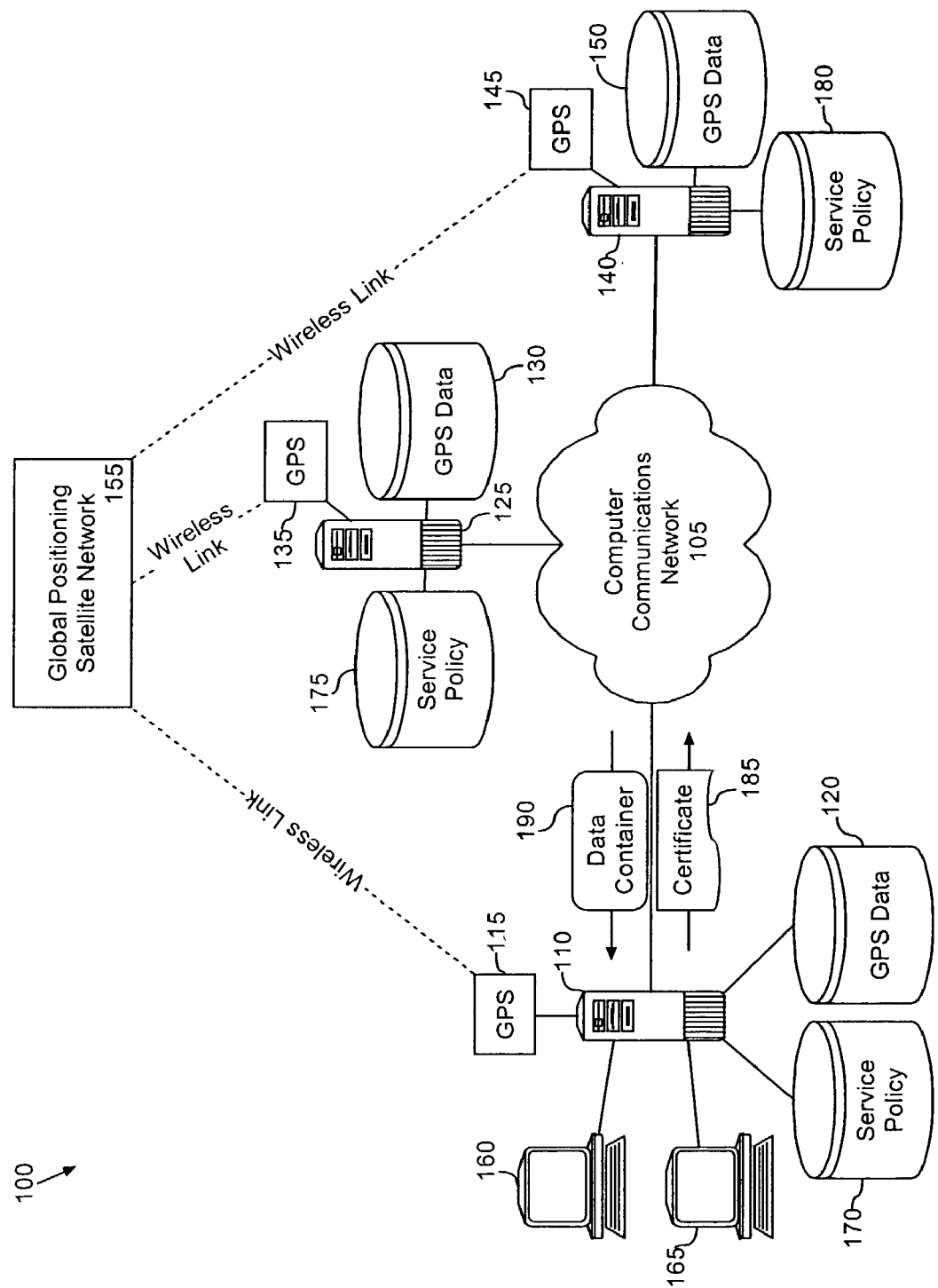
FIG. 1 is a schematic diagram illustrating an information delivery system in accordance with the inventive arrangements disclosed herein.

FIG. 1 is a schematic diagram illustrating an information delivery system 100 in accordance with the inventive arrangements disclosed herein. As shown in FIG. 1, the system 100 can include a computer communications network 105, such as the Internet, which can communicatively link a local server 110, and servers 125, and 140. The local server 110, for example an Internet Service Provider (ISP) or other online service provider having a point-of-presence, can provide computer systems 160 and 165 with access to the computer communications network 105. The local server 110 can include the equipment and telecommunication line access necessary to have a point-of-presence on the Internet or otherwise be connected to a wide area network (WAN), a local area network (LAN), or the like. The servers 125 and 140 can provide information requested via Hypertext Transfer Protocol (HTTP) requests or file transfer (FTP) requests from users through computer systems 160 and 165. For example, responsive to a request, the servers 125 and 140 can provide markup language documents, whether Hypertext-Markup Language, Voice Extensible Markup Language, or Extensible Markup Language documents, as well as other files including text files, multimedia files, audio files, and video files.

The local server 110 and the servers 125 and 140 can be communicatively linked to GPS receivers 115, 135, and 145 respectively to receive GPS information from the Global Positioning System 155. The GPS receivers 115, 135, and 145 also can be integrated within their respective computer systems 110,125, and 140. The twenty-four Global Positioning Satellites comprising the Global Positioning System 155 (hereafter "GPS") were deployed in such a way that at least four satellites can be electronically visible at any time and from any place on earth. The GPS 155 relies on radio waves for each satellite to broadcast the parameters of its location. Associated with the broadcast information is a time stamp indicating the temporal mark of the beginning of the transmission of information. The administrator of the GPS 155 guarantees that the clocks on each satellite are synchronized with each other. Therefore, the timers of the twenty-four satellites are universally consistent.

The GPS receivers 115, 135, and 145 can generate a constantly changing code. Each satellite can transmit its signal using the same codes, generated at the same time. The satellite signal is received at a later time due to the distance traveled. The receiver determines the amount of delay by delaying its own code until it matches that of the satellite. The time duration for the delay is used to measure the distance. With code riding on top of the carrier signals from three different satellites, each of the local server 110 and servers 125 and 140, with the GPS receivers, can identify its current location on earth, for example latitude, longitude, and altitude should a fourth satellite be in view of the GPS receiver. In addition to determining location, the GPS 155 may be used in the global determination of accurate time. GPS receivers operating on known stations can provide timing accuracy of about 0.3 microseconds with only one satellite in view.

Although the GPS 155 has been described herein, those skilled in the art will recognize that another satellite positioning system can be used. For example, Global Navigation Satellite System (GLOSNASS) or any other suitable location and time sensing system can be used. Accordingly, the present invention is not so limited to the use of the GPS 155. Rather the term GPS, as used herein, should be construed to refer to any satellite positioning or other system capable of determining location and timing information at various points on the earth.

The local server 110 and the servers 125 and 140 also can be communicatively linked to GPS data stores 120, 130, and 150 respectively. The GPS data stores 120, 130, and 150 can include locations of other servers as specified by their GPS determined coordinates. Thus, the servers 125 and 140 and the local server 110 can access their respective GPS data stores to determine effective routing of data as well as determine effective caching policies, for example, by noting the frequency with which data is requested or accessed from particular servers, the time required to obtain information from particular servers, and/or the distance of particular servers.

The local server 110 and the servers 125 and 140 also can be communicatively linked to service policy data stores 170, 175, and 180. The service policy data stores can include rules for delivering data items to specific users such as users 160 and 165. The rules can specify particular locations or geographic regions akin to Web-based zip codes from which data containers are not to be accepted and/or provided, for example by monitoring the source of a request as specified by its data container. The rules further can specify permissible types and sizes of data containers to be accepted and sent. For example, the type can specify the file type of the data item within the data container or the variety of information within the data container such as HTTP or FTP request. The size of the data within the data containers also can be specified by the data container, and thus monitored. The service policy data stores 170, 175, and 180 also can include rules for accepting or sending data over particular distances. The service policy data stores further can specify quality of service rules indicating permissible times for the delivery of data containers and permissible grades of service such as urgent, regular, bulk, and the like.

The service policy data stores can be updated and serviced by administrators. The service policy data stores can be accessible by the computer systems 160 and 165 thereby providing the users with greater control over the information which is to be delivered to the computer systems 160 and 165. For example, users can access a user specific service policy within the service policy data store 170. Alternatively, the service policies can be located on the computer systems 160 and 165 such that the local server 110 can access the service policies after a user has logged onto the network.

In operation, the local server 110 can receive HTTP requests from the user computers 160 and 165. The local server 110 can associate each of the received requests with a data container. For example, according to one embodiment of the present invention, the requests can be associated with digital certificates, such as digital certificate 185, or stamps to distinguish user initiated requests from data items received from the computer communications network 105. If, however, a similar mechanism is used for data items originating from computer systems 160 and 165 and from the computer communications network 105, then attributes or header information can be modified to distinguish between data items originating from users and those received from the computer communications network 105.

The data containers, for example data container 190, can include identifying information, algorithms, programs, and/or control structures. Accordingly, a data container can be a collection of information stored on a computer system's secondary storage or accessible to a computer system over a communications network. The identifying information, for example data container attributes specified in a header portion of the data container, can specify the size of the content included within the data container, the grade of service of the object such as urgent, first class, or bulk, the type of the content or file, for example audio, video, text, markup language file, HTTP requests, and/or FTP requests, as well as GPS information specifying locations and times which the data container passed through GPS receiver equipped nodes of the computer communications network 105.

The local server 110 can receive GPS information specifying a location, date, and time from the GPS receiver 115 and include the GPS information in a data container, for example in a header portion of the data container to be associated with the user request. The GPS information can be included in the data container on the application level. For example, the local server, having assembled the packetized request, can associate the received request with a data container or include the request within the data container as the case may be. For example, GPS and other data container information can be added in the transport layer 4, the session layer 5, the presentation layer 6, and/or the application layer 7 of the open systems interface (OSI) specification. Application Ser. No. 09/683,592 filed Jan. 23, 2002 entitled "Geochronicle Based Identification For E-Business", the subject matter of which is incorporated herein by reference, is directed to associating GPS information with objects in a communications network. In any case, the request and the associated data container can be sent over the computer communications network 105 such that a destination server such as server 125 or 140 can examine the container to determine the location from which the request was sent.

Similarly, data items received by the local server 110 from the computer communications network 105 from servers 125 and 140 can be associated with data containers as well. For example, content initially requested from the computers 160 and 165 can be sent from the originating servers 125 and/or 140 using data containers. Prior to sending the requested data item or items, the server 125, for example, can associate or include (hereafter collectively referred to as "include") the data item with a data container. Similar to the operation of server 110, the server 125 can include data item size information, data item type information, grade of service information, and GPS information within the data container.

Accordingly, the local server 110 can examine the received data container to determine the location which provided the information, or the originating location, as well as the date and time the information was sent. Upon receiving the data container from the computer communication network 105, the local server 110 also can determine the GPS information from the GPS receiver 115. This information can be included within the data container or can be stored locally. Regardless, using the data specified within the data container and the newly determined GPS information, the local server 110 can determine the time required for delivering the data container and associated content, the distance traveled by the data container over the network, and any other intermediate nodes through which the data container passed that included GPS information within the data container.

The local server 110 further can log the usage of outbound data containers and inbound data containers on a per user basis. As the data containers specify the size of the data items included therein, a calculation regarding the amount of bandwidth used by each user can be determined. In an alternative embodiment, however, only selected users need be monitored, for example, in high network traffic environments.

Although reference has been made to the use of data containers for both requests from users and data items received from the computer communications network 105, the present invention can maintain a distinction between the two types of data items. That is, the system 100 can log user requests separately from received data to be distributed to users. As mentioned, although data containers can be utilized for both types of data wherein the data container includes an indication of whether the information was received from a user or from the computer communications network 105, other types of digital monitoring mechanisms can be used such as digital certificates, stamps, envelopes, and the like. For example, digital certificates can be associated with received HTTP requests, while data containers can be used for incoming data files or data items received responsive to the requests. Accordingly, the invention is not limited to use of a single or particular delivery or tracking mechanism. Rather, the term data containers as used herein, can be construed to include virtual containers, boxes, stamps, digital certificates, and the like.

The use of data containers, stamps, digital certificates, and the like provides a simplified technique for monitoring and managing both inbound and outbound network bandwidth usage. For example, rather than specifying bandwidth usage according to the number of bytes utilized, one can refer to the number of containers and/or stamps wherein the data containers and/or stamps can be associated with a predetermined size. In illustration, if a single container is able to include one megabyte of data, then usage of 30 containers per day for inbound data can be translated into 30 megabytes of inbound bandwidth usage daily.

The local server 110 can consult the service policy data store 170 to determine whether the received data container conforms to the rules specified for the destination address. For example, the rules can be specified on a per user basis and indicate allowable grades of service such as urgent or regular delivery, allowable data types such as markup language documents, audio and/or video files, allowable originating locations, allowable data item sizes, allowable delivery distances, allowable delivery times between the originating point and the destination point, as well as the actual time the data item is delivered.

Figures 2, 3:
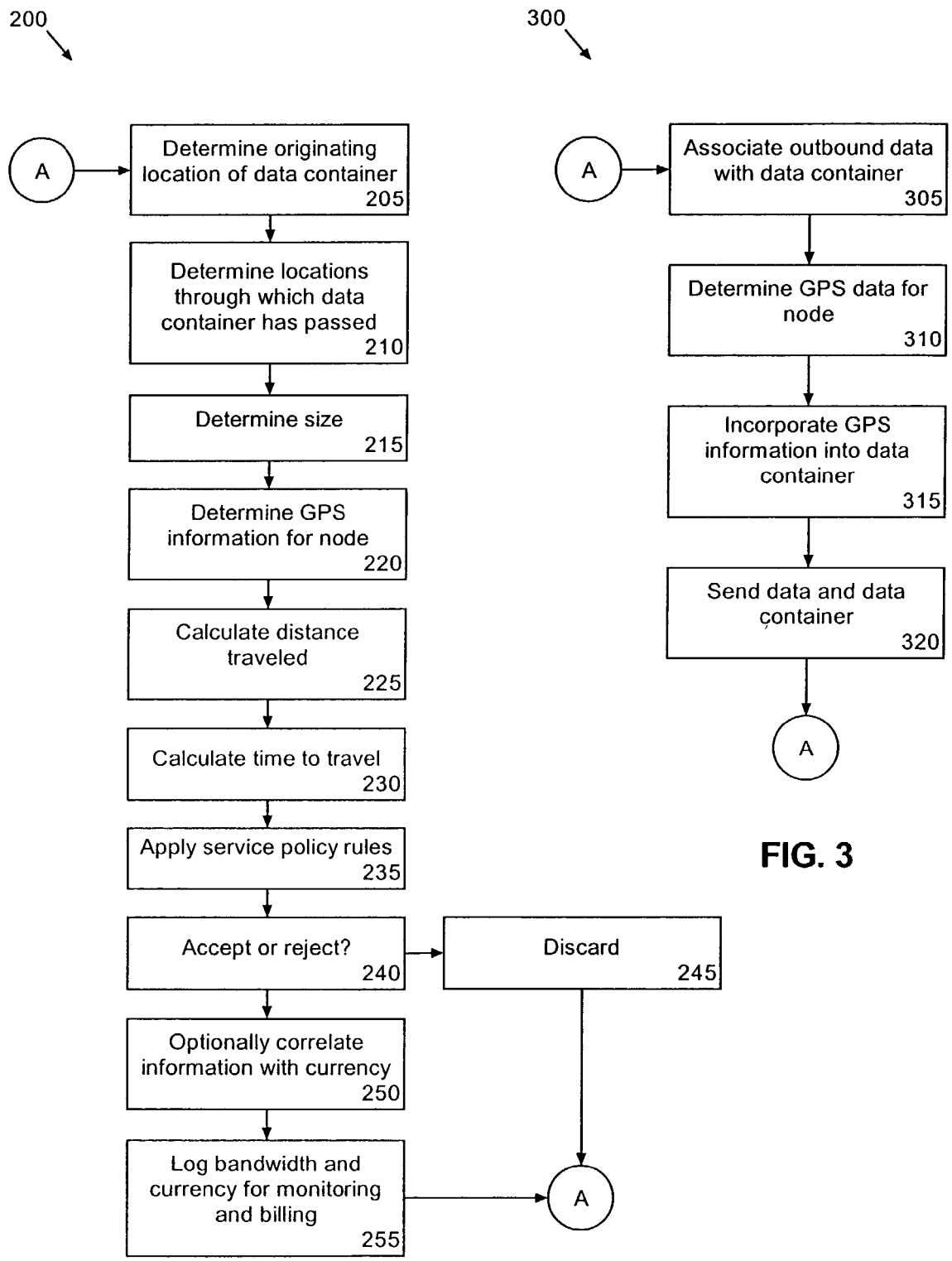
FIG. 2 is a flow chart illustrating a method of processing data containers received from a computer communications network in accordance with the inventive arrangements disclosed herein.
FIG. 3 is a flow chart illustrating a method of processing data items to be sent over a data communications network in accordance with the inventive arrangements disclosed herein.

FIG. 2 is a flow chart illustrating a method 200 of processing data containers received from a computer communications network in accordance with the inventive arrangements disclosed herein. The method 200 can begin in a state wherein a user has logged onto the computer communications network. For example, a local server of the network can perform an operation to bind the user's logon identifier with the assigned Internet protocol (IP) address or utilize any other persistent mechanism for identification within a network. The operation can establish a network user identifier which is associated with the user for the duration of the user's online session. As the local server can assign IP addresses and reclaim the IP addresses for reuse, the local server can collect bandwidth consumption information associated with the user. Additionally, according to one aspect of the present invention, a predetermined number data containers can be allocated to one or more users.

Accordingly, the local server can begin processing a data container received from the computer communications network. For example, the data item can be a file to be forwarded to a particular user or an HTTP request from elsewhere within the computer communications network. In step 205, the originating location of the data container can be determined. The data container can be examined to determine the location of the originating server, or the server from which the data was provided. For example, the GPS information of the data container can be identified and processed to determine the originating location. If more than one set of GPS information is specified, the local server can identify and log the set of GPS information having the earliest time stamp as the originating location.

In step 210, if more than one set of GPS information is specified in the received data container, the other locations through which the data container has passed can be identified and logged. In step 215, the size of the data included within the data container can be identified. For example, attributes of the data container can be examined to determine the size of the payload or file that is included therein. In step 220, the local server can determine current GPS information. In particular, the local server can access the attached GPS receiver to obtain current GPS information. Accordingly, the GPS information can be incorporated into the data container or can be logged within another data store.

In any case, in step 225, with reference to the origination location of the data container and the GPS information of the local server determined in step 220, the distance over which the data container traveled can be computed. In step 230, the time required for the data container to travel from the origination point to the local server also can be determined from the GPS information.

In step 235, the local server can access the service policy rules corresponding to the user to which the data item and associated container are to be delivered. As mentioned, the service policy rules can specify rules for delivering particular data containers and/or associated items to a user. Alternatively, the service policy rules can be implemented on a network wide basis, for example within a local area network or a wide area network. For instance, the service policy rules can specify allowable data item sizes to prevent excessively large files from being delivered, prohibited regions or Web zip codes, which may or may not correspond to actual zip codes, from which data containers are to be rejected, allowable delivery grades of service for preventing, for example, spam or bulk electronic mailings which may utilize a bulk mail or third class type of data container, allowable file types for the data container payload, distance limitations for rejecting data containers having traveled a distance greater than allowed, and quality of service limitations on receiving data containers that have been in route more than a predetermined amount of time.

Notably, the association of geographic information such as GPS information with data sent over a network can be further correlated with regional codes such as zip codes and geopolitical designations such as cities, counties, states, and the like. Thus, data sent over a network can be tracked and monitored with respect to geographic locations. Grades of service, the distance over which data is sent, as well as the other trackable parameters disclosed herein can be monitored, charged, and/or referenced with respect to geopolitical designations to facilitate ease of understanding. For example, one can specify first class delivery from New York City to Paris rather than specifying a distance parameter or referring to GPS readings.

In step 240, a determination can be made in accordance with the service policy rules whether to accept or reject the received data container. The data container can be examined to determine any additional information such as grade of service while any additional calculations with respect to the GPS data can be performed. If the data container is to be rejected, the method can continue to step 245 to reject or discard the data container. The method then can continue to jump circle A to repeat as necessary. If, however, in step 240 the determination was to accept the data container, the method can continue to step 250.

In step 250, the data container can be correlated with an electronic or Web-based currency. For example, the container attributes can be examined to associate attributes of the container such as the distance traveled, the grade of delivery, the size, quality of service, and the type of file included within the data container with a monetary amount. Accordingly, based upon the aforementioned attributes, a monetary value can be associated with the data container thereby allowing the local server to bill the receiving user account. Although the local server can track container delivery to bill accounts based upon any of the aforementioned factors, the invention disclosed herein is particularly useful for billing according to bandwidth usage. Thus, in step 255, the local server can log bandwidth usage and currency for billing.

FIG. 3 is a flow chart illustrating a method 300 of processing data items to be sent over a computer communications network in accordance with the inventive arrangements disclosed herein. The method can begin in a state wherein a user has logged onto the computer communications network and has initiated a data request. For example, the user can issue an HTTP request or an FTP request for content. After the request has been received by the local server, in step 305 the request can be included within a data container. The data container, as previously noted, can specify a grade of service, the size of the data contained therein, and the type of request, for example HTTP or FTP. As mentioned, data containers utilized for outbound data items can be differentiated from those data containers received from the computer communications network. In consequence, the local server can monitor not only the data items and bandwidth consumed by a user for downloaded data items, but also can monitor the requests issued or initiated by the user.

In step 310, the local server can determine GPS information from the GPS receiver that is operatively connected or incorporated within the local server. In step 315, the GPS data can be incorporated into the data container. The resulting data container can specify the location from which the data container originated as well as the date and time which the data container originated. In step 320, the data container and associated data item payload can be sent over the computer communications network. After completion of step 320, the method can proceed to jump circle A to repeat as necessary.

As the local server can track the number of data containers utilized and the attributes of the data containers used by different users, an alternative method of billing and tracking can be to allocate to each user a predetermined number of data containers. As the data containers are used, the data container allocation for that user can be decremented. The user can be allocated a single allotment of data containers to be used as both incoming and outgoing data containers or can be allocated separate amounts of both types of data containers to be tracked separately. When the data container allocation is depleted, the user can request or purchase additional data containers. Data containers also can be allocated by payload capacity or any other measurable attribute such as grade of service or time of delivery as disclosed herein.

The present invention allows users to regulate Web content and information. For example, Web sites which provide offensive or undesirable information can be easily identified by location and blocked by an end user or a hub administrator using service policy rules stored in the service policy data store. The use of GPS information with particular network components such as servers, can optimize performance of the information delivery network. For example, as GPS information related to neighboring servers, other network components, and information delivery metrics can be stored at each server, servers can be configured to execute algorithms to identify optimized and efficient routes for transferring information throughout the information delivery network.

Knowledge pertaining to surrounding servers and other network components can be utilized for deploying different caching policies which can facilitate faster information transfers. For example, the GPS information can be used to identify physical locations of network components and distances which can be shared throughout the information delivery network. This shared information can be used to determine caching policies to facilitate more efficient information transfer and storage within the information delivery network.

The data containers, whether inbound or outbound, can operate in concert to provide a bandwidth management and control system. Notably, the data container attributes can vary according to fluctuating bandwidth costs in different parts of the world and/or at different times during the day. The data containers also can be used for cross-network traffic measurement and control. For example, where a network has multiple network domains, the data containers can be used to track the services provided by one domain to another. This can be significant in cases where the network domains are operated by separate entities wherein each entity pays for a share of the bandwidth usage. A further aspect of the invention can include examining time attributes of the GPS information for determining quality of service. For example, by examining time stamps of the GPS information associated with each data container, certain minimum quality of service standards can be maintained.

Notably, the use of separate tracking mechanisms for inbound and outbound data items further provides network administrators with the ability to restrict downloads and/or uploads. For example, allowing users to upload data can be costly and require significant network storage space. Using the present invention, uploads can be restricted by decreasing the number of available outbound data container mechanisms to a number such that the per user allotment of data containers can be managed by the network. Still, the count can be reduced to zero in the case where uploads are to be prohibited. A similar technique can be utilized for downloaded data.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of managing network resources in a terminating node of an information delivery network, said method comprising:

receiving an inbound data container comprising a data item, said data container specifying a size of said data item and global positioning information for an originating node in said information delivery network;

determining global positioning information for said terminating node;

determining global positioning information for at least one intermediate node of said information delivery network if said data container is conveyed to the at least one intermediate node prior to reaching the terminating node, wherein said global positioning information is used to determine a time required for delivering said data container, distance traveled by said data container over the information delivery network, and a number of intermediate nodes traversed by said data container if said data container traverses at least one intermediate node prior to reaching the terminating node;

correlating said global positioning information with geopolitical designations to determine at least one of a geopolitical area said data container originated from, a geopolitical area said data container traversed, and a geopolitical area said data container was received at by said terminating node, each geopolitical designation being associated with a cost-of-service;

analyzing said inbound data container by comparing said global positioning information for said originating node and said terminating node;

determining bandwidth usage according to said received inbound data container; and identifying a user associated with said data container and billing said user a monetary amount based on at least one of said determined bandwidth, one or more geopolitical designations, the time required for delivering said data container, and the distance traveled by said data container over the information delivery network.

2. The method of claim 1, further comprising:

allocating a predetermined number of inbound data containers to accounts; and tracking consumption of said allocated inbound data containers to determine bandwidth usage.

3. A computer implemented method of managing network resources in a terminating node of an information delivery network, said method comprising:

associating a data request with an outbound data container, said outbound data container specifying a size of said data request;

determining a set of global positioning information for said terminating node;

including said set of global positioning information within said outbound data container;

sending said outbound data container through said information delivery network;

determining global positioning information for at least one intermediate node of said information delivery network if said data container is conveyed to the at least one intermediate node prior to reaching the terminating node, wherein said global positioning information is used to determine a time required for delivering said data container, distance traveled by said data container over the information delivery network, and a number of intermediate nodes traversed by said data container if said data container traverses at least one intermediate node prior to reaching the terminating node;

correlating said global positioning information with geopolitical designations to determine at least one of a geopolitical area said data container originated from, a geopolitical area said data container traversed, and a geopolitical area said data container was received at by said terminating node, each geopolitical designation being associated with a cost-of-service;

determining bandwidth usage according to said sent outbound data container; and identifying a user associated with said data container and billing said user a monetary amount based on at least one of said determined bandwidth, one or more geopolitical designations, the time required for delivering said data container, and the distance traveled by said data container over the information delivery network.

4. The method of claim 3, further comprising:

allocating a predetermined number of outbound data containers to accounts; and tracking consumption of said allocated outbound data containers to determine bandwidth usage.

5. The method of claim 3, further comprising:

allocating a predetermined number of data containers to accounts, said data containers to be used as said outbound data containers; and tracking consumption of said allocated data containers to determine bandwidth usage.

6. A computer-implemented method of managing network resources in a terminating node of an information delivery network, said method comprising:

receiving an inbound data container comprising a data item, said inbound data container specifying a size of said data item and global positioning information for an originating node in said information delivery network;

determining global positioning information for said terminating node;

determining global positioning information for at least one intermediate node of said information delivery network if said data container is conveyed to the at least one intermediate node prior to reaching the terminating node, wherein said global positioning information is used to determine a time required for delivering said data container, distance traveled by said data container over the information delivery network, and a number of intermediate nodes traversed by said data container if said data container traverses at least one intermediate node prior to reaching the terminating node;

correlating said global positioning information with geopolitical designations to determine at least one of a geopolitical area said data container originated from, a geopolitical area said data container traversed, and a geopolitical area said data container was received at by said terminating node, each geopolitical designation being associated with a cost-of-service;

analyzing said inbound data container by comparing said global positioning information for said originating node and said terminating node associating a data request with an outbound data container, said outbound data container specifying a size of said data request;

determining a second set of global positioning information for said terminating node;

including said second set of global positioning information within said outbound data container;

sending said outbound data container through said information delivery network;

determining a bandwidth usage according to at least one of said inbound data container and said outbound data container; and identifying a user associated with said data container and billing said user a monetary amount based on at least one of said determined bandwidth, one or more geopolitical designations, the time required for delivering said data container, and the distance traveled by said data container over the information delivery network.

7. The machine-readable storage of claim 6, further comprising:

allocating a predetermined number of said inbound and outbound data containers to accounts; and tracking consumption of said allocated inbound and outbound data containers to determine bandwidth usage.

8. The machine-readable storage of claim 6, further comprising:

allocating a predetermined number of data containers to accounts, said data containers to be used as said inbound and said outbound data containers; and tracking consumption of said allocated data containers to determine bandwidth usage.

* * * * *